United States Patent [19]
Schornhorst

[11] 3,930,826
[45] Jan. 6, 1976

[54] CONDITIONING FLAT GLASS FOR REMOVAL FROM SUPPORTING LIQUID FOLLOWING FORMING

[75] Inventor: James R. Schornhorst, Pittsburgh, Pa.

[73] Assignee: PPG Industries, Inc., Pittsburgh, Pa.

[22] Filed: Oct. 15, 1974

[21] Appl. No.: 514,969

[52] U.S. Cl. .............. 65/65 A; 65/99 A; 65/182 R
[51] Int. Cl.² ........................................ C03B 18/02
[58] Field of Search ....... 65/65 A, 99 A, 182 R, 204

[56] References Cited
UNITED STATES PATENTS
3,218,143  11/1965  DeLajarte ........................... 65/65 A

*Primary Examiner*—Arthur D. Kellogg
*Attorney, Agent, or Firm*—E. Kears Pollock

[57] ABSTRACT

Flat glass is produced by advancing a layer of molten glass along the surface of molten metal while cooling it sufficiently to form a continuous sheet of glass which is lifted upwardly from the surface of a supporting pool of molten metal and conveyed from it for further processing. The molten metal substantially immediately beneath the location at which the glass is lifted upwardly from the pool of molten metal is cooled to a temperature below that of a surrounding molten metal in order to provide for the free release of the formed sheet of glass from the molten metal and to provide for the production of an extremely flat sheet of glass.

3 Claims, 6 Drawing Figures

CONDITIONING FLAT GLASS FOR REMOVAL FROM SUPPORTING LIQUID FOLLOWING FORMING

CROSS REFERENCE TO RELATED APPLICATIONS

This application is related to application Ser. No. 483,508, entitled, "Manufacture of Glass" filed June 27, 1974, by Gerald E. Kunkle and assigned to the present assignee.

BACKGROUND OF THE INVENTION

Field of the Invention: This invention relates to a method for the manufacture of a continuous sheet of glass by supporting molten glass on a pool of molten metal while forming and cooling the glass. More particularly, this invention relates to a method for cooling the molten metal in a manner so as to enhance the lifting of the sheet of glass upwardly from the pool of molten metal and to produce glass of superior flatness.

Description of the prior art: Molten glass may be delivered onto molten metal and formed into a continuous sheet or ribbon of glass according to the teachings of Heal, U.S. Pat. No. 710,357 or of Hitchcock, U.S. Pat. No. 789,911, according to the teachings of Pilkington, U.S. Pat. No. 3,083,551 and U.S. Pat. No. 3,220,816 or according to the teachings of Edge and Kunkle, application Ser. No. 338,497, filed Mar. 6, 1973. These patents describe processes in which continuous sheets of flat glass are formed while the glass being formed is supported on molten metal. After a continuous sheet of glass has been formed, it has been shown to be removed from the surface of a pool of supporting molten metal by lifting it slightly and conveying it away from the pool of molten metal. U.S. Pat. No. 3,233,995 to Javaux and U.S. Pat. No. 3,420,647 to Charnock describe the removal of a partially formed layer of glass from the surface of the pool of molten metal and drawing and forming this into a continuous sheet of glass by drawing it upwardly from the surface of the pool of molten metal in the manner of the Pittsburgh, Colburn or Fourcault processes.

In a process wherein a finished continuous sheet of glass is lifted from the surface of a pool of molten metal on which it is formed there is invariably some affinity for the molten metal to the formed sheet of glass. This is most pronounced when the molten metal, for example, molten tin, becomes partially oxidized and adheres to the newly formed glass as dross. There is also an affinity between such molten metals in a reduced state and a freshly formed surface of glass. This is evident in the fact that flat glass produced by supporting the glass on molten metal using any of the known processes for doing so has approximately an order of magnitude higher tin concentration in its surface region that has been adjacent to molten metal during forming as in its other surface region that has been facing away from the molten metal during forming.

It has been observed that the bottom surface of glass which has been in contact with molten metal during its formation is characterized by a series of very fine transverse ridges and valleys extending across the width of the sheet and repeating periodically along its length in a direction of glass movement along the surface of the molten metal and away from the pool of molten metal. It has now been discovered that these transverse ridges and valleys can be substantially eliminated from the surface of flat glass that has been in contact with molten metal during forming. This is accomplished most conveniently when the continuous sheet of flat glass that is formed is lifted from the surface of the pool of supporting metal at a relatively large angle, such as, for example, when the formed glass is lifted upwardly from the pool of molten metal and conveyed vertically upward therefrom.

SUMMARY OF THE INVENTION

A continuous sheet of flat glass is produced by a method including the following steps: Molten glass is delivered onto the surface of a pool of molten metal maintained within a forming chamber. The molten metal is preferably tin, an alloy of tin or some other metal having a specific gravity greater than the glass and having a melting point lower than the glass to be formed while being substantially nonreactive to the glass and its melting temperature. The layer of molten glass is advanced along the surface of the pool of molten metal and is cooled during such advance to form a dimensionally stable, continuous sheet of glass.

Forces are applied to the glass while it is advanced along the surface of the pool of molten metal. Forces may be applied to the glass which are aligned substantially along its path to cause it to be advanced. These forces may be sufficient to cause the glass to be attenuated to a thickness less than an equilibrium thickness during its advance. These forces are characterized as longitudinal tractive forces and may be applied to any location along the length of the glass sheet. They are preferably applied to the glass at locations well along its path of advance and are transferred to the hot or more fluid glass primarily by the surface tension of the glass. Other forces may be applied to the glass in a manner such that they are aligned substantially across or transverse to the path of glass advance. These forces are characterized as transverse forces. The resultant forces caused by the application of the described forces in combination with the reactive surface tension and gravity forces acting on the glass cause the glass to be formed into a continuous, flat sheet of desired thickness.

After the glass has been cooled sufficiently to become dimensionally stable (that is, if it has reached its final width and thickness) it is advanced further along the surface of molten metal and then is lifted from the surface of the pool of molten metal and conveyed from the forming chamber. It may be lifted slightly and conveyed along a substantially horizontal path from the forming chamber, but it preferably is lifted and conveyed upwardly from the pool of molten metal in the manner described by Gerald E. Kunkle in his copending, commonly assigned patent application which is incorporated by reference herein.

The glass is cooled sufficiently prior to lifting it from the surface of the pool of molten metal so that its width and thickness remain unchanged during lifting and conveyance from the forming chamber. It is desirable to adjust or control the temperature of the glass so that its viscosity will be within the range from about $10^5$ to $10^{12.5}$ poises (gram/centimeter/second) at the time of lifting. It is further desirable to adjust and maintain the temperature of the glass during its upward conveyance so that the temperature will be decreased sufficiently to cause the viscosity to be greater than about $10^{13}$ poises while maintaining the glass in flat, planar alignment. While it is possible to contact the continuous sheet of glass by rolls or other devices at the location where it is lifted from the surface of the pool of molten metal, it is preferred that the continuous sheet of glass be permitted to freely form a curved, lifting region having a radius as dictated by the temperature and viscosity of the glass rather than by any externally imposed force from a roll or other contacting device.

As the glass is being formed during its advance along the surface of the pool of molten metal and as it is conveyed from the pool of molten metal, it is controllably cooled. It has now been found desirable to establish a well-defined region of cooling substantially immediately beneath the location of lifting the continuous sheet of glass from the pool of molten glass within that pool of molten metal so that the temperature of the pool of molten metal immediately beneath the location of lifting and extending transversely across the pool of metal within the forming chamber is colder than the immediately surrounding portions of the pool of molten metal. This is thought to both cool the metal-glass interface substantially immediately before it is separated and to cause a region of downwardly circulating molten metal flow within the pool of molten metal immediately beneath the location of lifting the glass upwardly from the pool of molten metal.

A pipe or other conduit may be extended across the forming chamber. Coolant is directed through such a conduit during the production of glass in order to provide the necessary cooling in the molten metal immediately beneath the location of lifting a continuous sheet of glass from the pool of molten metal. For example, in a forming chamber for the production of soda-lime-silica glass and having a pool of molten metal with a depth of 2 inches and a width of 10 feet, a 1-inch outside diameter, stainless steel pipe may be positioned across the chamber beneath the location for lifting glass midway between the bottom of the chamber and the surface of the pool of molten metal. Water having an inlet temperature of from 50° to 100°F. (10° to 40°C), may be directed through such a pipe at a rate of from 10 to 50 gallons per minute (35 to 200 liters/min) while producing a continuous sheet of glass at a rate of 50 tons ($4.55 \times 10^4$ kilograms) per day. Glass produced in this manner has a bottom surface that has been in contact with the pool of molten metal during forming which is characterized as being extremely smooth and flat without apparent transverse ridges and valleys such as are encountered when glass is produced without such cooling.

The downward, circulating flow of molten metal beneath the location for lifting the continuous sheet of glass from the pool of molten metal may be provided in ways other than by local cooling of the molten metal. For example, a downward flow of molten tin may be induced at such a location by applying magnetohydrodynamic forces to the molten glass or by providing a transverse drain in the bottom of the forming chamber for continuously removing molten metal from the chamber which molten metal may then be recirculated to the pool of molten metal in the chamber. This invention will be further understood from the drawings accompanying this application.

DESCRIPTION OF THE PREFERRED EMBODIMENTS

Figure 1:
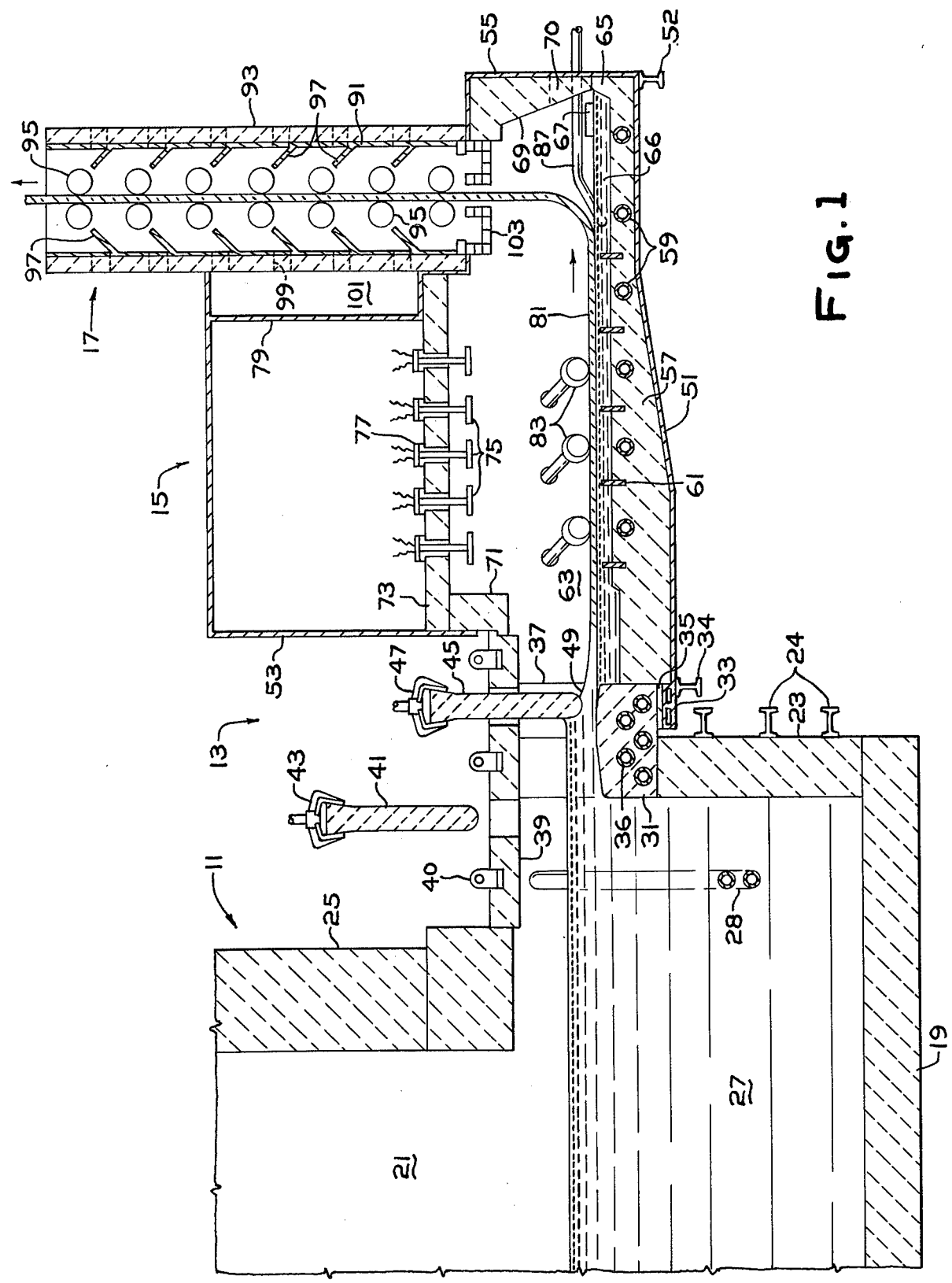
FIG. 1 is a sectional elevation view of an apparatus for producing flat glass in accordance with this invention.

Referring now to FIG. 1 there is shown a view of a suitable apparatus for carrying out the present invention. The glassmaking apparatus comprises a furnace 11, delivery means 13 and a forming chamber 15 and a vertical conveyor 17 which may be, and preferably is, included in an annealing lehr. It will be understood that the lifting and conveying apparatus employed in the practice of this invention may be designed to cause the glass to be conveyed along an upwardly extending path that need not be vertical as shown in FIG. 1.

The glassmaking furnace 11 includes a melting section (not shown) and a refiner or conditioner, the end of which is shown. The refining or conditioning section of the furnace 11 comprises a furnace bottom 19, sidewalls 21 and a front basin wall 23. The front basin wall 23 is maintained in position by structural members 24. The furnace further comprises an upper front wall 25 which is preferably suspended or supported from above and a roof overlying the upper portion of the furnace, the roof not being shown.

The delivery means 13 includes a threshold 31 resting on a cooling block 33 or other support, which is supported by structural members 34. A cast refractory seal 35 or the like exposed between the threshold 31 and the cooling block 33 extending through the holes in the threshold are conduits or pipes 36 for transporting coolant or the like through the interior of the threshold 31 and for controlling its temperature during use. At the ends of the threshold 31 there are sidewall portions or jambs 37 on the sides of the channel through which molten glass may be delivered from the pool of molten glass 27 residing in the bottom portion of the furnace 11. The top of the delivery means 13 is defined by a roof 39. The roof is preferably a flat arch which is supported by supporting means (not shown) extending above it and connected to flat arch supporters 40 embedded in the flat arch itself. Extending transversely across the delivery means 13 are two gates or tweels. The first tweel is a backup tweel 41 connected to a support assembly 43 (not fully shown) for raising or lowering it into engagement in the pool of molten glass 27. The second tweel is a control tweel 45 supported by support assembly 47 (not fully shown) for raising and lowering the tweel. The tweel is held in operating position in contact with the molten glass to be delivered for forming. The control tweel 45, along with the threshold 31 and the jambs 37, defines an opening through which a layer of molten glass 49 may be delivered for forming.

The forming chamber 15 comprises a bottom casing 51 supported on support 62 in addition to support 34.

This casing is preferably a casing constructed of metal, such as steel. The casing is preferably impervious to the molten metal in the chamber. The forming chamber 15 further comprises a top casing 53 and an end casing 55. Both of these casing members are also preferably constructed of impervious metal. Disposed within the bottom casing 51 is a refractory bottom 57, preferably a refractory bottom that has been cast in place inside the bottom casing 51. Preferably embedded within the bottom refractory 57 are pipes 59 through which coolant or other fluid may be directed for controlling the temperature of the forming chamber 15 at discrete locations along its length. Also extending transversely across the forming chamber 15 are dams or weirs 61 mounted in the refractory bottom 57 and extending across its width. These dams are preferably vertically movable and are held down at their ends at each side of the forming chamber. They are preferably constructed of material that is less dense than the molten metal in the forming chamber so that their vertical position may be varied upwardly or downwardly by controlled adjustment of their holddown devices at their ends.

The forming chamber 15 further comprises refractory sidewalls 63 and a refractory exit lip 65. These, along with the bottom refractory 57 and the threshold 21, define a container in which a pool of molten metal 66, preferably molten tin or an alloy of tin, is disposed. At the downstream end of the forming chamber there is provided extension 67 of the bottom container portion of the forming chamber which serve as cavities into which dross floating on the surface of the molten metal 66 may be withdrawn for removal from the forming chamber. The upper portion of the forming chamber includes an end wall liner 69 preferably constructed of refractory material. This liner 69 and the end casing 55 to which it is connected may include a suitable opening 70 through which a continuous sheet of glass may be withdrawn from the forming chamber along a substantially horizontal path in the event that such removal is temporarily desired.

The upper portion of the chamber further includes a lintel 71 at its upstream end. This lintel 71 may be used as a means for supporting delivery means roof 39. Additionally the upper portion of the chamber includes a ceiling or roof 73 preferably constructed of refractory material suitable for radiating or absorbing heat uniformally over the area facing the glass beneath it during operation. Extending through the ceiling of the forming chamber are controllable heating elements 75 used to control the rate of heat removal from the glass during forming. These heating elements are connected to bus bars 77 which are connected, in turn, to a source of power (not shown). The upper portion of the forming chamber 15, preferably includes a top casing end wall 79 providing a space between the upper portion of the forming chamber 15 and the upstream or furnace side of the conveyor mechanism 17. During operation a protective gas, such as a mixture of hydrogen and nitrogen or other non-oxidizing gas, is preferably directed into the forming chamber and conveyor.

Advancing along the surface of the pool of molten tin 66 is a continuous sheet of glass 81 formed from the layer of molten glass 49 delivered onto the pool of molten tin for forming. Extending into the forming chamber through its sidewalls there may be provided edge contacting devices 83 for applying outward tractive forces to the layer of glass 49 during its advance along the pool of molten metal for forming. These devices are preferably driven wheels disposed and driven in such manner as to apply opposing outward or transverse forces to the glass to maintain its width during its attenuation. The resultant forces resulting from the combination of longitudinal and transverse forces acting on the glass cause it to be attenuated to a thickness that is less than that which would be attained by molten glass if allowed to remain on the surface of the pool of molten metal for a sufficient time to come to equilibrium with it.

Extending into the molten tin beneath the conveyor 17 at a location near where the glass is to be lifted from the pool of molten metal, there is a cooler 87 disposed transversely across the forming chamber in the pool of molten metal 66 and providing for the localized cooling of the molten metal substantially immediately beneath the location where a continuous sheet of glass 81 is to be lifted from the pool of molten metal 66. It is through the use of such a cooler 87 that the molten metal may be locally cooled and local molten metal flows may be established within the molten metal which together are sufficient to cause the glass being produced to have an extremely smooth bottom surface as it is lifted from the pool of molten metal and conveyed away from it.

The vertical conveyor 17 comprises a machine casing 91 and thermally insulated machine wall 93. The machine walls 93 are preferably constructed of refractory material. Within a vertical conveyor there is a series of supporting rolls 95 for engaging a continuous sheet of glass 81 for conveying it upwardly through the conveyor. These machine rolls are operated in a coordinated manner. They are used to apply sufficient tractive forces to the glass to convey it upwardly and to transmit tractive forces along the glass downwardly and about the curved glass at liftoff to the hot or more fluid glass within the advancing layer of glass 49 where the glass is hotter and fluid and susceptible to forming and attenuation.

Disposed across the internal space within the conveyor casing at several locations along its length are machine seals 97 for retarding the flow of gases either upwardly or downwardly through the enclosed space surrounding the rolls 95. Extending through the walls of the enclosed conveyor are openings 99 through which cullet may be directed in the event the continuous sheet of glass is chipped or broken in the upper portion of the conveyor. A space is provided between the top casing of the forming chamber and the walls of the vertical conveyor for accommodating cullet removal. This space is characterized as a cullet chamber 101.

In a preferred embodiment of this invention coolers 103 are disposed across the bottom portion of the vertical conveyor to control the removal of heat from a continuous sheet of glass 81 as it is conveyed upwardly from the surface of the pool of molten metal of the forming chamber.

Figure 2:
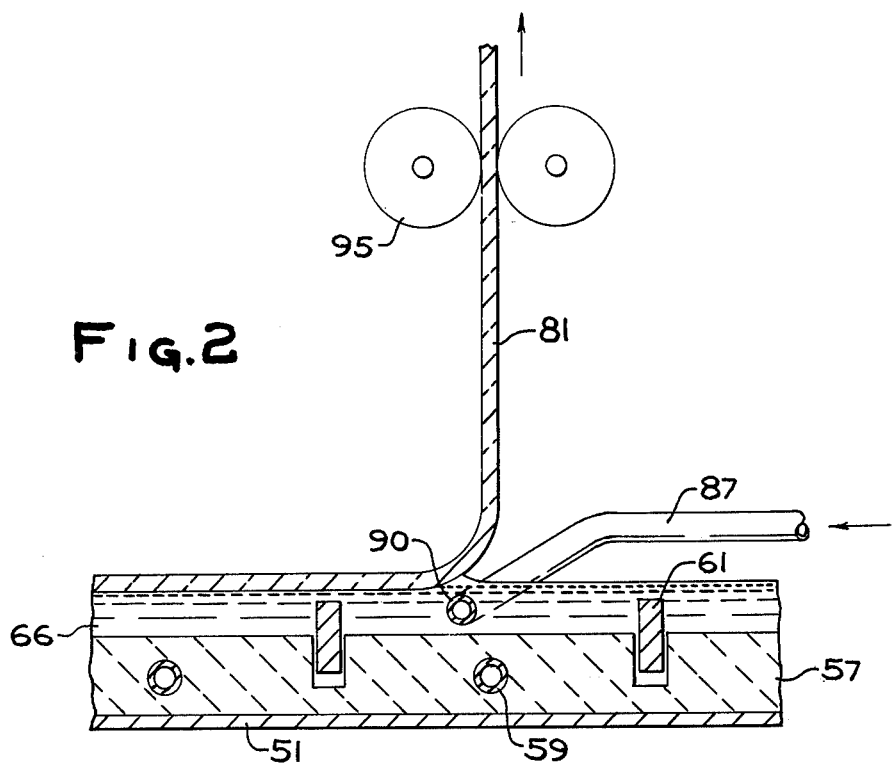
FIG. 2 is a partial sectional view of the liftoff location in such a forming chamber showing in greater detail a particular embodiment of this invention.
Figure 3:
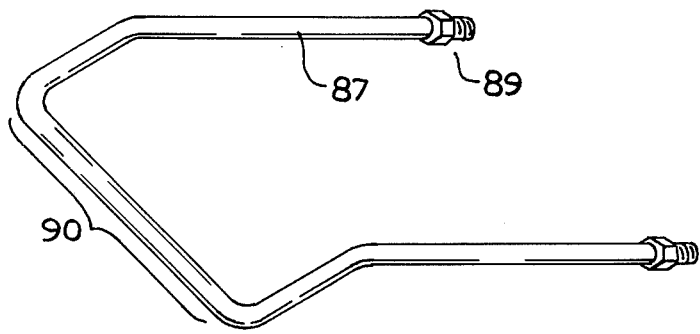
FIG. 3 is a perspective view showing a suitable cooler for use in an apparatus for carrying out this invention.

Referring now to FIGS. 2 and 3, there is shown in greater detail suitable apparatus for practicing this invention. A cooler 87 comprising a suitably shaped length of pipe (stainless steel or even ordinary carbon steel, for example) is provided with pipe connectors 89 to which may be connected flexible or fixed conduits external to the forming chamber. The cooler 87 includes a transverse portion 90, and the cooler is inserted into the forming chamber 15, preferably through opening 70 and positioned so that the transverse portion 90 of the cooler extends across the forming chamber immersed in the molten metal 66. The transverse portion 90 of the cooler 89 is preferably aligned parallel to the rolls 95 and at a uniform depth beneath the surface of the molten metal 66. The transverse portion 90 of the cooler 89 is preferably positioned close to the plane defined by the adjacent facing surfaces of the series of paired rolls 95 in the conveyor 17. In the production of thin glass (that is glass having a thickness on the order of ⅛ inch (3.2 mm) thick or less) it is desirable to locate the transverse portion 90 of the cooler 89 slightly upstream from the plane defined by the facing surfaces of the rolls 95.

Figure 4:
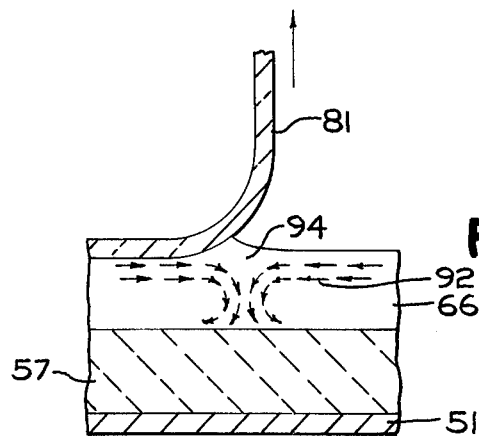
FIG. 4 is an enlarged partial sectional view of the liftoff of a continuous sheet of glass from a pool of molten metal showing the desired circulating molten flows beneath the location of liftoff which provides for the production for glass having superior flatness.

In FIG. 4 there is shown by arrows 92 the expected locally circulating convective flow of molten metal induced in the pool of molten metal 66 just below the liftoff of the sheet of glass 81. This flow 92 and the relatively quiescent molten metal 94 near the surface of the molten metal, as well as the local cooling of the glass-metal interface at liftoff, are thought to contribute to the benefits obtained when practicing this invention. Although local cooling is the preferred method for carrying out this invention, any convenient method of establishing the local metal flow shown and described here is now contemplated as benefiting the process. The downward flow should be near or directly beneath the glass being lifted from the pool of molten metal. If a drain is placed remote from this location a horizontal parallel flow, rather than a downward flow, is established near the location for lifting glass.

Figure 5:
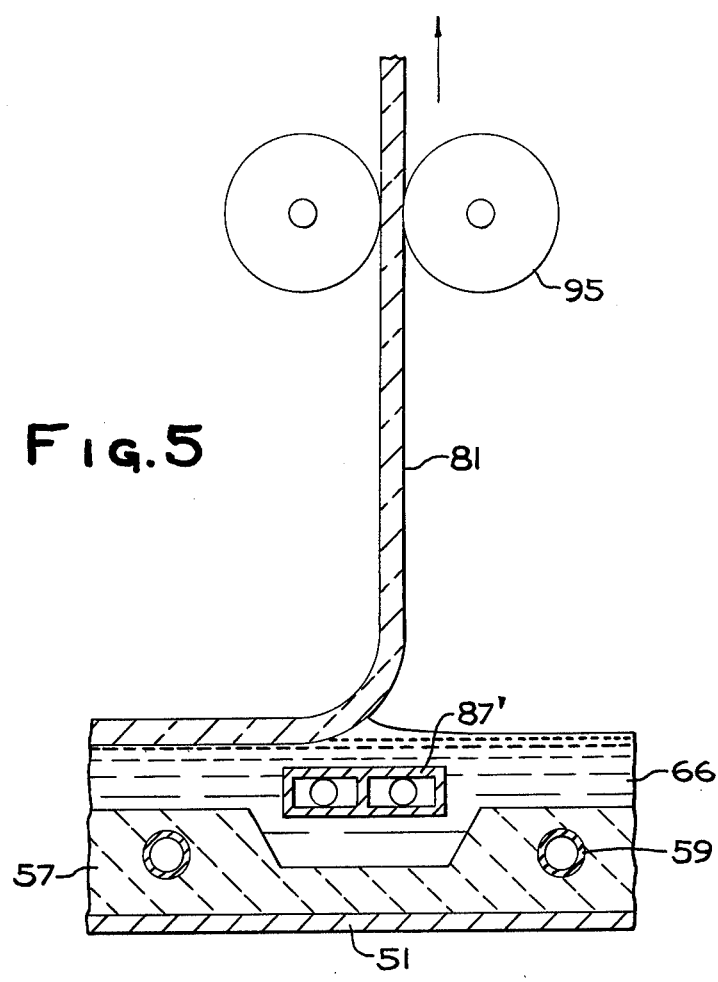
FIG. 5, like FIG. 2, is an enlarged partial sectional view of the liftoff of a continuous sheet of glass showing an alternative embodiment of this invention.
Figure 6:
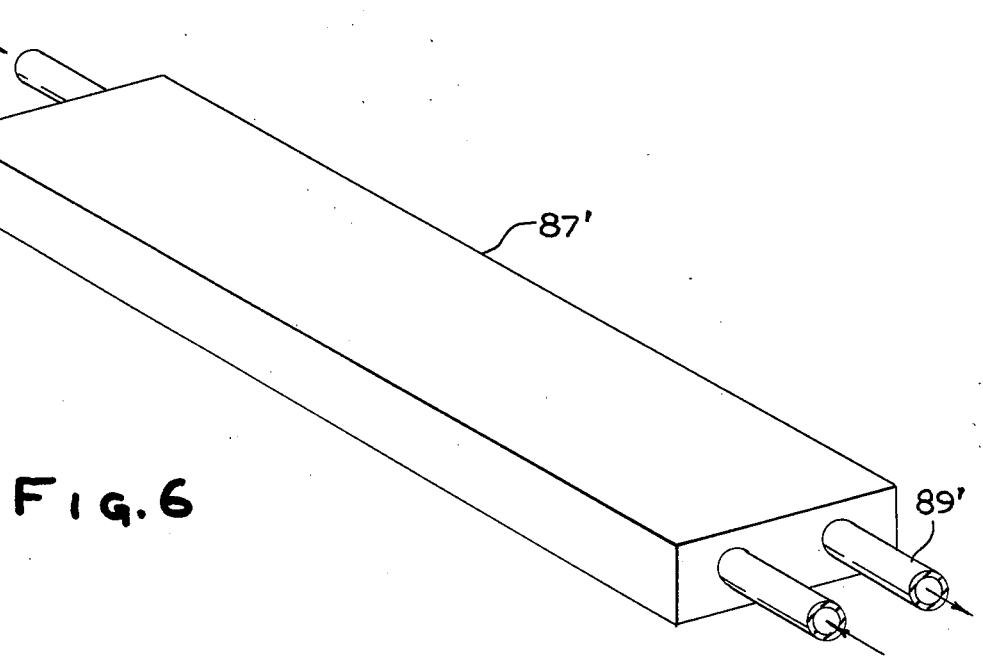
FIG. 6 is a perspective view of the cooler employed in the embodiment of this invention shown in FIG. 5.

Another preferred embodiment of this invention is illustrated in FIGS. 5 and 6. FIG. 5, like FIG. 2, is an enlarged elevation section of the liftoff region of a forming chamber. In this embodiment of the invention the bottom 57 of the chamber is provided with a transverse trough or deepened portion so that a greater depth of molten metal is provided immediately beneath the location for lifting a continuous sheet of glass 81 from the pool of molten metal 66. Disposed transversely across the chamber in this trough and beneath the surface of the pool of molten metal 66 is a cooler 87' having at its ends connectors 89' for connection to a source and sink (not shown) for coolant. A particular advantage of this embodiment of the invention is that heat is efficiently removed from the molten metal due to the large surface area of the cooler 87' while two downward flows of molten metal adjacent the cooler sides (the upstream and downstream sides) cause a large quiescent region 94 to develop near the surface of the molten metal beneath the location for lifting glass.

Although this invention has been described with reference to specific embodiments, it will be understood that variations from these illustrative examples may be made without departing from the invention contemplated here. For example, in the practice of this invention, glass may be delivered for forming by pouring or flowing a stream of molten glass onto molten metal, or a preformed ribbon of glass may be delivered and then reheated for forming. For the purpose of describing this invention, all glass delivery is described as molten glass to indicate that the glass may be formed.

I claim:

1. In a method of making flat glass comprising the steps of delivering molten glass onto the surface of a pool of molten metal contained in an enclosed chamber, supporting the glass on the molten metal, advancing the delivered glass as a single layer of glass in a path along the surface of the pool of molten metal while cooling the glass to form a dimensionally stable, continuous sheet of glass and continuing to advance the dimensionally stable, continuous sheet of glass along the path of advance, freely lifting the dimensionally stable, continuous sheet of glass substantially vertically upwardly from the surface of the pool of molten metal and conveying the lifted, dimensionally stable, continuous sheet of glass substantially vertically upwardly from the pool of molten metal wherein, as the dimensionally stable, continuous sheet of glass is freely lifted from the pool of molten metal, it assumes a continuously curved shape along its length and an exposed meniscus of molten metal is formed across the width and against one surface of the dimensionally stable, continuous sheet of glass, which surface had been in contact with the molten metal prior to lifting, the improvement which comprises:

cooling the molten metal from within the pool of molten metal substantially beneath the glass being lifted and beneath the exposed meniscus of molten metal at a depth and in an amount sufficient to induce a downward flow of molten metal for drawing the meniscus downwardly whereby the elevations and depressions characterizing the surface of the dimensionally stable, continuous sheet of glass which had been in contact with the molten metal are observably diminished.

2. The method according to claim 1 wherein the pool of molten metal is provided with greater depth beneath where the dimensionally stable, continuous sheet of glass is lifted and the cooling is at a depth and in an amount sufficient to cause a downward flow of molten metal into the greater depth of molten metal.

3. In an apparatus for making flat glass comprising means for preparing molten glass, means for delivering molten glass from the molten glass preparation means to a forming chamber, a forming chamber comprising an enclosed chamber having a bottom, a roof, spaced sidewalls and upstream and downstream ends and containing a pool of molten metal having a general depth in a lower portion and a head space for maintaining a protective atmosphere over the pool of molten metal in an upper portion and further comprising means for advancing the glass along the surface of the pool of molten metal and means for cooling the glass during its advance to form a continuous sheet of flat glass therefrom and means for lifting the continuous sheet of flat glass upwardly from the pool of molten metal at a lifting location and for conveying it upwardly therefrom, the improvement comprising:

a trough extending transversely across the bottom of the chamber at the lifting location beneath the lifting means for providing a portion of the pool of molten metal with a depth sufficiently greater than the general depth of the pool of molten metal to provide for substantially greater thermally induced circulation in the portion of greater depth than in the remainder of the pool of molten metal; and means for selectively cooling the molten metal in the portion of the pool of molten metal beneath the lifting location to a temperature below the temperature of the molten metal upstream of the lifting location and below the temperature of the molten metal downstream of the lifting location, said cooling means extending at least partially lengthwise in the trough in the bottom of the forming chamber and extending at least partially beneath an exposed surface of the molten metal.

* * * * *